(12) United States Patent
Lightner et al.

(10) Patent No.: US 9,361,317 B2
(45) Date of Patent: Jun. 7, 2016

(54) METHOD FOR ENTITY ENRICHMENT OF DIGITAL CONTENT TO ENABLE ADVANCED SEARCH FUNCTIONALITY IN CONTENT MANAGEMENT SYSTEMS

(71) Applicant: QBASE, LLC, Reston, VA (US)

(72) Inventors: Scott Lightner, Leesburg, VA (US); Birali Hakizumwami, Centreville, VA (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/558,191

(22) Filed: Dec. 2, 2014

(65) Prior Publication Data
US 2015/0254350 A1  Sep. 10, 2015

Related U.S. Application Data

(60) Provisional application No. 61/947,652, filed on Mar. 4, 2014.

(51) Int. Cl.
*G06F 17/30* (2006.01)

(52) U.S. Cl.
CPC ...... *G06F 17/30256* (2013.01); *G06F 17/3051* (2013.01); *G06F 17/30241* (2013.01); *G06F 17/30516* (2013.01); *G06F 17/30864* (2013.01); *G06K 2209/01* (2013.01); *G06K 2209/27* (2013.01)

(58) Field of Classification Search
CPC .................. G06F 17/30256; G06F 17/30268
See application file for complete search history.

(56) References Cited

U.S. PATENT DOCUMENTS

| | | |
|---|---|---|
| 6,128,660 A | 10/2000 | Grimm et al. |
| 6,178,529 B1 | 1/2001 | Short et al. |
| 6,266,781 B1 | 7/2001 | Chung et al. |
| 6,353,926 B1 | 3/2002 | Parthesarathy et al. |
| 6,738,759 B1 | 5/2004 | Wheeler et al. |
| 6,832,373 B2 | 12/2004 | O'Neill |
| 7,058,846 B1 | 6/2006 | Kelkar et al. |

(Continued)

FOREIGN PATENT DOCUMENTS

WO    2013/003770 A2    1/2013

OTHER PUBLICATIONS

International Search Report dated Apr. 15, 2015 corresponding to International Patent Application No. PCT/US2014/067997, 4 pages.

(Continued)

*Primary Examiner* — Jeffrey A Burke
(74) *Attorney, Agent, or Firm* — Eric L. Sophir; Dentons US LLP

(57) ABSTRACT

Disclosed is a system and method for extending search capabilities of contentment management systems, such as SharePoint 2013®, to enable geographic and name entity based searches. Geographic and named entity searches are enabled by a content enrichment web service. The content enrichment web service calls a geotagging or a named entity tagger web service application to tag crawled managed properties as input and return geographically or entity modified managed properties as output. The system associates one or more geographically and named entity modified managed properties with content and stores this information as metadata in a SharePoint 2013® search index. Thus, the search system allows users to identify a particular geographic entity the user is interested in finding, and to receive search results directly related to that geographic entity on SharePoint 2013®.

10 Claims, 2 Drawing Sheets

(56) References Cited

U.S. PATENT DOCUMENTS

| | | | |
|---|---|---|---|
| 7,370,323 | B2 | 5/2008 | Marinelli et al. |
| 7,421,478 | B1 | 9/2008 | Muchow |
| 7,447,940 | B2 | 11/2008 | Peddada |
| 7,543,174 | B1 | 6/2009 | van Rietschote et al. |
| 7,681,075 | B2 | 3/2010 | Havemose et al. |
| 7,818,615 | B2 | 10/2010 | Krajewski et al. |
| 7,899,871 | B1 | 3/2011 | Kumar et al. |
| 7,917,286 | B2 * | 3/2011 | Taylor et al. ............... 701/468 |
| 8,055,933 | B2 | 11/2011 | Jaehde et al. |
| 8,122,026 | B1 | 2/2012 | Laroco et al. |
| 8,341,622 | B1 | 12/2012 | Eatough |
| 8,345,998 | B2 | 1/2013 | Malik et al. |
| 8,356,036 | B2 | 1/2013 | Betchel et al. |
| 8,375,073 | B1 | 2/2013 | Jain |
| 8,423,522 | B2 | 4/2013 | Lang et al. |
| 8,429,256 | B2 | 4/2013 | Vidal et al. |
| 8,520,909 | B2 * | 8/2013 | Leung et al. ............... 382/118 |
| 8,726,267 | B2 | 5/2014 | Li et al. |
| 8,782,018 | B2 | 7/2014 | Shim et al. |
| 8,995,717 | B2 | 3/2015 | Cheng et al. |
| 9,009,153 | B2 | 4/2015 | Khan et al. |
| 2001/0037398 | A1 | 11/2001 | Chao et al. |
| 2002/0165847 | A1 | 11/2002 | McCartney et al. |
| 2002/0174138 | A1 | 11/2002 | Nakamura |
| 2003/0028869 | A1 | 2/2003 | Drake et al. |
| 2003/0112792 | A1 | 6/2003 | Cranor et al. |
| 2003/0158839 | A1 | 8/2003 | Faybishenko et al. |
| 2003/0182282 | A1 | 9/2003 | Ripley |
| 2004/0027349 | A1 | 2/2004 | Landau et al. |
| 2004/0143571 | A1 | 7/2004 | Bjornson et al. |
| 2004/0153869 | A1 | 8/2004 | Marinelli et al. |
| 2004/0205064 | A1 | 10/2004 | Zhou et al. |
| 2004/0215755 | A1 | 10/2004 | O'Neill |
| 2005/0192994 | A1 | 9/2005 | Caldwell et al. |
| 2006/0101081 | A1 | 5/2006 | Lin et al. |
| 2006/0129843 | A1 | 6/2006 | Srinivasa et al. |
| 2006/0294071 | A1 | 12/2006 | Weare et al. |
| 2007/0005639 | A1 | 1/2007 | Gaussier et al. |
| 2007/0203693 | A1 | 8/2007 | Estes |
| 2007/0203924 | A1 | 8/2007 | Guha et al. |
| 2007/0240152 | A1 | 10/2007 | Li et al. |
| 2007/0250519 | A1 | 10/2007 | Fineberg et al. |
| 2007/0282959 | A1 | 12/2007 | Stern |
| 2008/0010683 | A1 | 1/2008 | Baddour et al. |
| 2008/0027915 | A1 | 1/2008 | Karasudani et al. |
| 2008/0027920 | A1 | 1/2008 | Schipunov et al. |
| 2008/0306908 | A1 | 12/2008 | Agrawal et al. |
| 2009/0019013 | A1 | 1/2009 | Tareen et al. |
| 2009/0043792 | A1 | 2/2009 | Barsness et al. |
| 2009/0049038 | A1 | 2/2009 | Gross |
| 2009/0089626 | A1 | 4/2009 | Gotch et al. |
| 2009/0094484 | A1 | 4/2009 | Son et al. |
| 2009/0240682 | A1 | 9/2009 | Balmin et al. |
| 2009/0292660 | A1 | 11/2009 | Behal et al. |
| 2009/0299999 | A1 | 12/2009 | Loui et al. |
| 2009/0322756 | A1 | 12/2009 | Robertson et al. |
| 2010/0077001 | A1 | 3/2010 | Vogel et al. |
| 2010/0138931 | A1 | 6/2010 | Thorley et al. |
| 2010/0223264 | A1 | 9/2010 | Bruckner et al. |
| 2010/0235311 | A1 | 9/2010 | Cao et al. |
| 2010/0274785 | A1 | 10/2010 | Procopiuc et al. |
| 2011/0071975 | A1 | 3/2011 | Friedlander et al. |
| 2011/0093471 | A1 | 4/2011 | Brockway et al. |
| 2011/0119243 | A1 | 5/2011 | Diamond et al. |
| 2011/0125764 | A1 | 5/2011 | Carmel et al. |
| 2011/0296397 | A1 | 12/2011 | Vidal et al. |
| 2012/0030220 | A1 | 2/2012 | Edwards et al. |
| 2012/0059839 | A1 | 3/2012 | Andrade et al. |
| 2012/0102121 | A1 | 4/2012 | Wu et al. |
| 2012/0117069 | A1 | 5/2012 | Kawanishi et al. |
| 2012/0131139 | A1 | 5/2012 | Siripurapu et al. |
| 2012/0143875 | A1 | 6/2012 | Sarma et al. |
| 2012/0246154 | A1 | 9/2012 | Duan et al. |
| 2012/0310934 | A1 | 12/2012 | Peh et al. |
| 2012/0323839 | A1 | 12/2012 | Kiciman et al. |
| 2013/0132405 | A1 | 5/2013 | Bestgen et al. |
| 2013/0144605 | A1 | 6/2013 | Brager et al. |
| 2013/0166480 | A1 | 6/2013 | Popescu et al. |
| 2013/0166547 | A1 | 6/2013 | Pasumarthi et al. |
| 2013/0290232 | A1 | 10/2013 | Tsytsarau et al. |
| 2013/0303198 | A1 | 11/2013 | Sadasivam et al. |
| 2013/0311485 | A1 | 11/2013 | Khan |
| 2014/0013233 | A1 | 1/2014 | Ahlberg et al. |
| 2014/0022100 | A1 | 1/2014 | Fallon et al. |
| 2014/0156634 | A1 | 6/2014 | Buchmann et al. |
| 2014/0244550 | A1 | 8/2014 | Jin et al. |
| 2014/0351233 | A1 | 11/2014 | Crupi et al. |
| 2015/0074037 | A1 | 3/2015 | Sarferaz |

OTHER PUBLICATIONS

Written Opinion of the International Searching Authority dated Apr. 15, 2015 corresponding to International Patent Application No. PCT/US2014/067997, 9 pages.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion of the International Searching Authority dated Feb. 24, 2015 corresponding to International Patent Application No. PCT/US2014/067918, 10 pages.

International Search Report and Written Opinion of the International Searching Authority dated Mar. 3, 2015 corresponding to International Patent Application No. PCT/US2014/067921, 10 pages.

Tunkelang, D., "Faceted Search," Morgan & Claypool Publ., 2009, pp. i-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

* cited by examiner

METHOD FOR ENTITY ENRICHMENT OF DIGITAL CONTENT TO ENABLE ADVANCED SEARCH FUNCTIONALITY IN CONTENT MANAGEMENT SYSTEMS

CROSS-REFERENCE TO RELATED APPLICATIONS

This non-provisional patent application claims the benefit of U.S. Provisional Patent Application Ser. No. 61/947,652, entitled "Method For Entity Enrichment Of Digital Content To Enable Advanced Search Functionality In Content Management Systems," filed Mar. 4, 2014, which hereby incorporated in its entirety herein.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; and U.S. patent application Ser. No. 14/557,807, entitled "Method for Facet Searching and Search Suggestions," filed Dec. 2, 2014; each of which are incorporated herein by reference in their entirety.

TECHNICAL FIELD

The invention generally refers to search engines and content management. More specifically, extending a content management system's search engine technology to enable geotagging and named entities enrichment of digital content.

BACKGROUND

Content management and document management systems for document versioning and collaborative project management are known. One non-limiting example may be Microsoft's Sharepoint 2013® software and application suite of tools. Microsoft SharePoint 2013® is a family of software products developed by Microsoft Corporation for collaboration, file sharing and web publishing. SharePoint 2013® may provide a user with a vast amount of content or information and it may become difficult for a user to find the most relevant information for a particular circumstance. To mitigate these issues SharePoint 2013® provides a search engine in order to assist users in finding the content that they need. A user may enter a keyword based search query and the search engine in SharePoint 2013® may return to the user a list of the most relevant results found within the context of the SharePoint 2013® platform once the content has been indexed.

At times a user may desire to find content related to geographic entities in SharePoint 2013® or other type of entity such as organizations or people referred to within a document. SharePoint 2013® does not provide out of the box functionality to automatically extract entities from documents. Particularly, it does not support geotagging content to extract geographic entities and resolve them to a geographic location. Also, SharePoint 2013 does not support entity tagging in order to identify, disambiguate and extract named entities, such as, organizations or people in a document. However, SharePoint 2013® search may be extended to enable effective geographic searches and other entity related searches, including entity-based search facets. Previous versions of SharePoint 2013® included "FAST Search" for SharePoint, from which it was possible to extend the content processing pipeline through sandboxed applications, but this was both slow and limited in the information it could access. SharePoint 2013® introduces a much more open API which makes it possible to add specialized linguistics such as concept extraction, relationship extraction, geotagging, summarization and as well as sophisticated text analytics. Thus, an opportunity exists to extend the capabilities of SharePoint 2013® search engine to enable geographic and other entity based searches.

SUMMARY

Disclosed herein are systems and methods for enabling geographic entity-based searches in content management systems, like Microsoft's SharePoint 2013®. Embodiments described The method involves extending the SharePoint 2013® search architecture by adding a geographic tagging web service. The system includes a computer processor operatively associated with a computer memory and one or more I/O device, in which the processor and memory are configured to operate one or more SharePoint 2013® processes. The system also includes another computer processor operatively associated with a computer memory and one or more I/O devices, in which the processor and memory are configured to host and provide processing for a geotagging web service. The SharePoint 2013® system may include a crawling component, a content processing component and a search indexing component in order to enable search of content. The content processing component in SharePoint 2013® search may extend its functionality by using the Content Enrichment Web Service (CEWS) feature.

The method involves crawling content from the different sources in order to obtain an array of crawled properties that are sent for content processing. During content processing, a trigger condition may determine if crawled properties may benefit from additional processing in order to enrich the original content with additional geographic metadata properties. If the crawled properties don't benefit from additional processing the crawled properties may be mapped to managed processing and sent to a search index. If the crawled properties benefit from external web services processing, the CEWS may make a simple object access protocol (SOAP) request to a configurable endpoint using hypertext transfer protocol (HTTP) or any other web service call method. An entity enrichment service may determine the type of content. If the content is in an image format, its metadata such as file location may be sent to an optical character recognition (OCR) engine so that the original document can be retrieved and processed asynchronously to convert to text and sent back to the crawl component to be re-crawled in text format. If the content is in text format the geotagging web service may identify geographic metadata and associate it with the content as managed properties. After the content has been geotagged, it may be sent to the indexing component.

An additional search user interface (UI) may be added using either SharePoint 2013® web parts or by modifying the standard layout of SharePoint 2013® search with standard web development tools such as HTML, HTML 5, JavaScript and CSS among others. The search UI may assist a user in performing geographic search queries or displaying geographic search results using digital geographic features such as for example and without limitation, digital maps. The search UI can also be enhanced to perform faceted search using the additional enriched entities or their associated metadata.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

Content capture is essential for searches. SharePoint 2013® search architecture involves a step of crawling and content processing in which components may be

Figure 1:
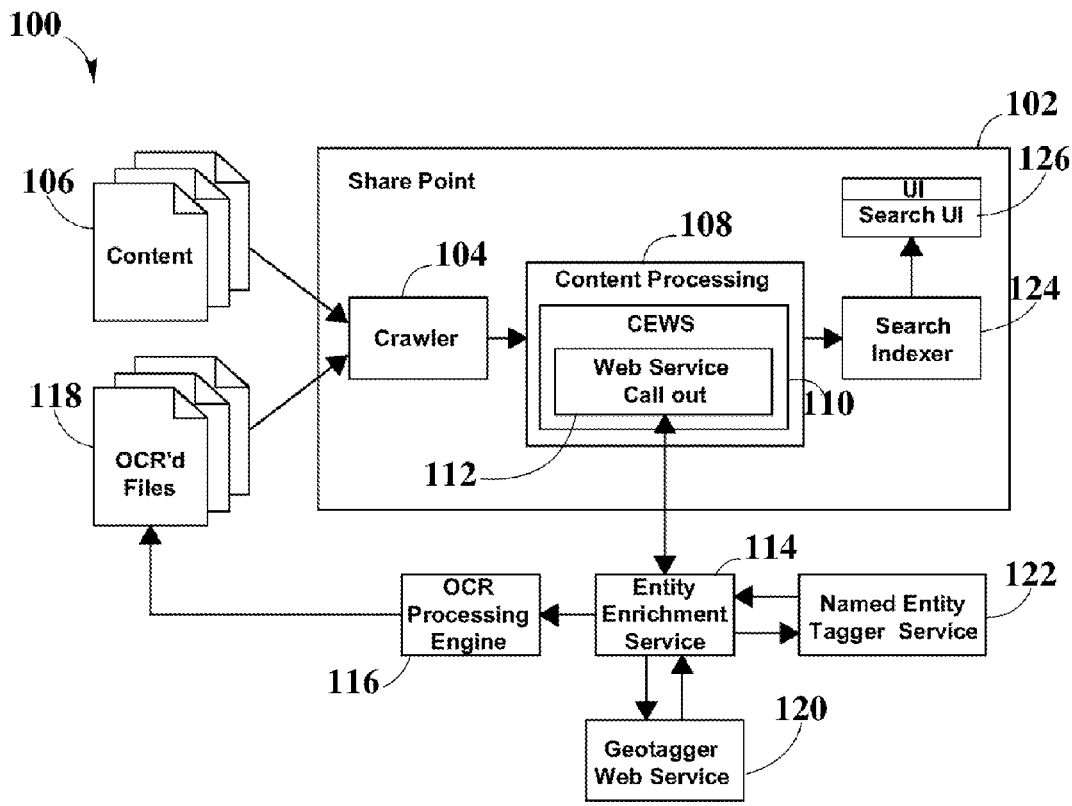
FIG. 1 is a system architecture for tagging and entity enrichment of content in a content management system.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used herein, the following terms have the following definitions:

"Geotagging" refers to the process of extracting geographic entities from unstructured text files. Geotagging may include disambiguating the entity to a specific geographic place and appending geographic metadata such as geographic coordinates, geographic feature type and other metadata.

"Entity Tagging" refers to the process of extracting named entities from unstructured text. Entity Tagging may include entity disambiguation, entity name normalization and appending entity metadata.

"Named Entity" refers to a person, organization or topic.

"Geographic Entity" refers to geographic location or geographic places.

"Crawled Properties" refers to content management system metadata obtained from inspecting documents during crawls.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 is a system architecture 100 for geotagging content in SharePoint 2013®. A Search index 124 is one of a number of key components in order to enable search in SharePoint 102. Another key part of enabling search in SharePoint 2013® 102 may be content capturing in order to index the content. SharePoint 102 includes a crawler 104 component in order to enable content capturing.

Crawler 104 may crawl through different content sources 106 adding a list of metadata properties to each content. Examples of content sources may include without limitation, SharePoint content, network file-share or user or intranet content. Crawler 104 may be configured perform the functions of connecting securely to a content source 106, associating document from the sources to their metadata as crawled properties. The crawler 104 may be configured to full or incremental crawls to content. Examples of crawled properties may include for example and without limitation author, title, creation date among others.

SharePoint 2013® includes a content processing 108 component. The content processing 108 component takes content from the crawler 104 and prepares it for indexing. Content processing 108 may involve stages of linguistic processing (language detection), parsing, entity extraction management, content-based file format detection, content processing error reporting, natural language processing and mapping crawled properties to managed properties among others.

Content processing 108 may be extended by means of a content enrichment web service (CEWS 110). CEWS 110 may enable the enrichment of content processing 108 by allowing a web service callout 112 to call external web service to perform additional actions and enrich the crawled data properties. Web service callout 112 may be a standard simple object access protocol (SOAP) request or any other web service call method used to exchange structured information of the crawled data with an entity enrichment service 114. Web service callout 112 may include trigger conditions configured in the content enrichment configuration object that control when to call an external web service for enrichment processing. Entity enrichment service 114 may also determine the document type of the crawled data in order to determine content that may come in the form of an image (scanned documents, pictures, etc.). Whenever content in the form of an image is found the entity enrichment service 114 may send the location of the crawled document to an OCR processing engine 116 such as for example and without limitation an optical character recognition component or other image processing component. OCR processing engine 116 may then retrieve and process the image files and convert them to text files asynchronously. The OCR'd processed files 118 may subsequently be re-fed to crawler 104 in order to be crawled as text files and sent back to content processing 108 and proceed with the rest of the workflow.

System architecture 100 may include an external geotagger web service 120 and a named entity tagger service 122. Both geotagger web service 120 and named entity tagger service 122 may be a software module configured to function as a web service application provider and to respond to web service callout 112. Geotagger web service 120 may use natural language processing entity extraction techniques, machine learning models and other techniques in order to identify and disambiguate geographic entities from crawled content. For example, geotagger web service 120 may disambiguate geographic entities by analyzing statistical co-occurrence of entities found in a gazetteer. Geotagger web service 120 may include a database of statistical co-occurring entities which may be linked against content found by crawler 104. Following the same technique, named entity tagger service 122 may be used to extract additional entities or text features such as organizations, people or topics.

Geotagger web service 120 may analyze an array of managed properties sent as input properties by CEWS 110 and identify any geographic entities referred in text. Non-limiting examples of input properties may include: FileType, IsDocument, OriginalPath and body among others. Geotagger web service 120 may then geotag the text by creating or modifying managed properties with reference to each geographic entity found. Geotagger web service 120 may send modified or new managed properties to the entity enrichment service 114 where a conversion is made that maps the modified managed properties and returns them as output properties back to CEWS 110. The same process may be used to interact with the named entity tagger service 122 for the extraction and entity tagging of other entities or text features such as organizations, people or topics.

After the augmented managed properties are returned by the entity enrichment service 114 the properties are merged with the crawled file managed properties and sent to a search index 124.

Once geographic and other entity tags have been associated with content and indexed, search queries may also be performed using geographic or named entity features. A search UI 126 in SharePoint 2013® may include specific displays that may assist a user in performing a geographic based search as well as support enhanced displays of faceted search results. The search UI 126 may be a custom web part or may also be done by modifying the standard layout of SharePoint 2013® search with standard tools such as HTML, HTML 5, JavaScript and CSS.

Figure 2:
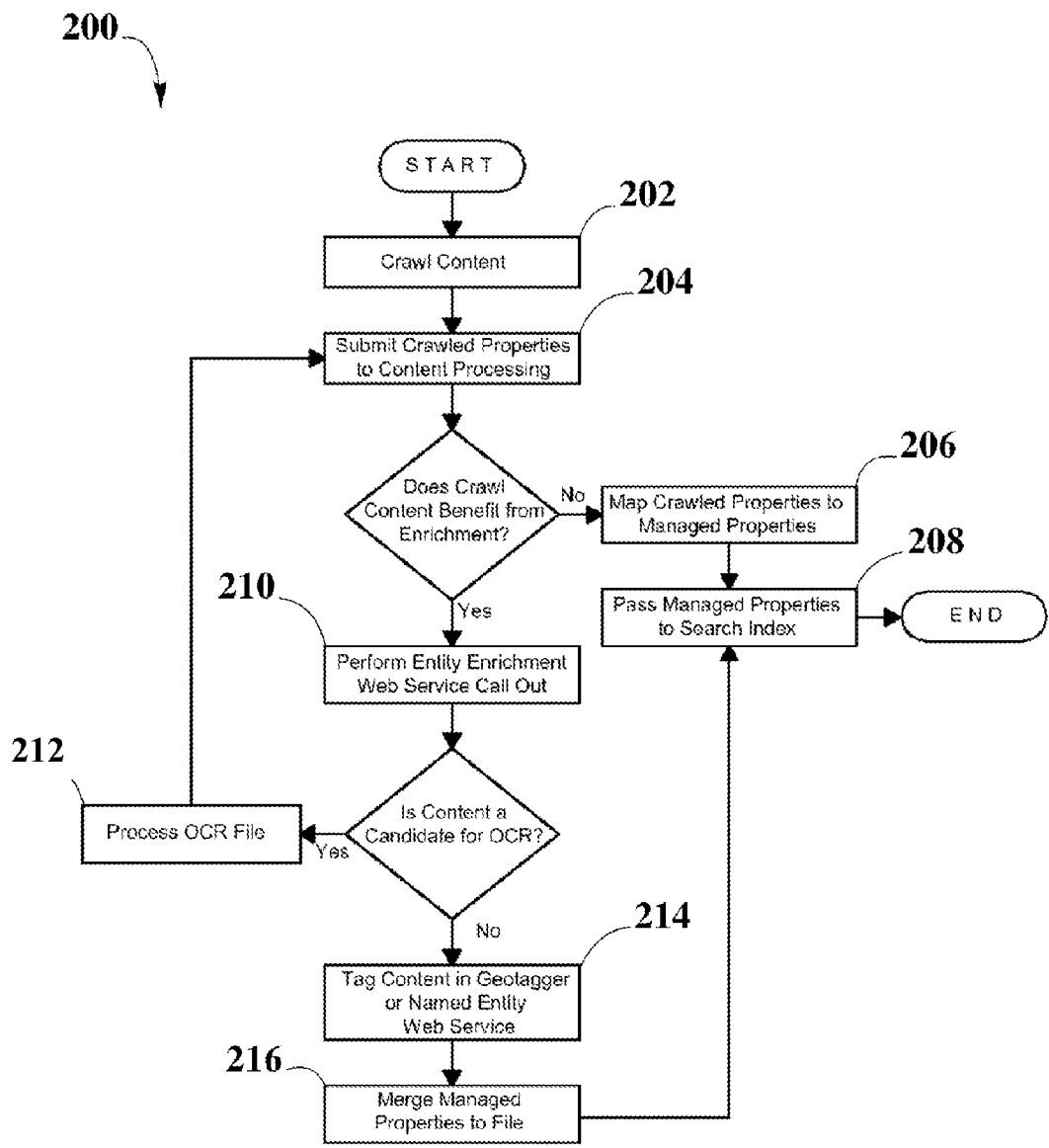
FIG. 2 is a process by which content is tagged and indexed for named and geographic entity searches.

FIG. 2 is a flow chart 200 illustrating the process steps for tagging content for SharePoint 2013® search. The process may begin when the crawler component in SharePoint 2013® performs a crawl for content (step 202). In one embodiment the crawl may be a full crawl, wherein in another embodiment the crawl may be an incremental crawl. The crawler component may then feed crawled properties and metadata to the content processing (step 204). A determination is made to verify if the crawled content may include geographic or named entities. For example and without limitation a trigger condition may be used. The trigger condition may contain a set of programmatic logic or rules which may determine if content may benefit from geotagging or entity tagging. If the trigger condition evaluates to false crawled content may be associated with managed properties (step 206) and passed to the search index component (step 208). If the trigger condition evaluates to true the CEWS may send a web service callout (step 210) to an entity enrichment service. The entity enrichment service may analyze the content sent in order to determine if the content may be in an image format (scanned documents, pictures, etc.). Content found in an image format may be processed asynchronously by an OCR engine and sent back to be re-crawled by the crawling component as text files (step 212). If the content is not in image format, the content may be processed by a geotagging web service or a name entity tagger service (step 214). The web service may extract and disambiguate geographic or named entities referred in the content and enrich them with entity metadata. The identified entities and their metadata may be sent back as managed properties to the content processing component and associated with the content (step 216). The associated metadata may then be sent to the search index component (step 206).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
   receiving, by a computer, a plurality of data streams associated with a plurality of data sources respectively;
   responsive to the computer detecting a triggering condition associated with data of a data stream, the triggering condition indicating whether the data requires geo-tagging or entity-tagging:
      generating, by the computer, geographic data associated with the data of the data stream; and
      updating, by the computer, metadata associated with the data of the data stream, the metadata containing the geographic data associated with the data;
   responsive to the computer not detecting the triggering condition for the data:
      mapping, by the computer, the metadata for the data source to a set of managed properties associated with a search index; and
   responsive to the computer determining that the data is image data:
      determining, by the computer, a storage location of a machine-readable document file containing the image data, based upon the metadata associated with the image data;
      executing, by the computer, an optical character recognition routine on the document file containing the image data received from the data source, thereby generating text data for the data of the data source; and
      updating, by the computer, the metadata of the data from the data source, in response to identifying geographic data associated with the text data.

2. The method according to claim 1, wherein executing the optical character recognition routine further comprises fetching, by the computer, the document file containing the image data from the storage location of the data source.

3. The method according to claim 2, wherein fetching the document file from the storage location further comprises downloading, by the computer, the document file from a server of the data source having a uniform resource location (URL) address according to the storage location in the metadata associated with the image data.

4. The method according to claim 1, wherein detecting the triggering condition further comprises:
   searching, by the computer, the data from the data source for one or more geographic entities; and
   determining, by the computer, that the data contains at least one geographic entity satisfying the triggering condition, wherein satisfying the triggering condition indicates that the data of the data stream requires the geographic data.

5. The method according to claim 1, wherein generating the geographic data associated with the data of the data stream further comprises identifying, by the computer, one or more geographic entities in the data of the data stream.

6. The method according to claim 5, wherein identifying the one or more geographic entities in the data further comprises:
   querying, by the computer, an entity database comprising non-transitory machine-readable storage media configured to store one or more entity records associated with a plurality of geographic entities respectively, each respective entity record comprising entity data that identifies the respective geographic entity in the text data; and
   comparing, by the computer, the text data with the entity data contained in the one or more records of the entity database.

7. The method according to claim 5, wherein identifying the one or more geographic entities in the data of the data stream further comprises determining, by the computer, a number of co-occurrences of the one or more geographic entities in one or more data sources, wherein the record of each respective geographic entity contains one or more co-occurrence counts for the respective geographic entity.

8. The method according to claim 5, wherein a geographic entity is selected from the group consisting of a geographic location, a geographic coordinate, and a geographic feature.

9. The method according to claim 5, wherein the entity database stores at least one entity record containing entity data that identifies an entity selected from the group consisting of: an organization, a person, and a topic.

10. The method according to claim 1, further comprising:
    in response to the computer receiving a query input from a graphical user interface:
    querying, by the computer, a content database for one or more geographic entities using the search index, in accordance with the query input, the content database hosted on one or more servers comprising non-transitory machine-readable storage media configured to store the data received from a plurality of data streams,
    wherein the data of at least one respective data stream is text data associated with metadata containing the geographic data identified in the text data of the at least one data stream.

* * * * *